United States Patent

Borsatti et al.

[11] Patent Number: 5,163,654
[45] Date of Patent: Nov. 17, 1992

[54] ELECTROMAGNETICALLY CONTROLLED VALVE FOR THE CONTROL OF THE PASSAGE OF A FLUID

[75] Inventors: Jean-Charles Borsatti; Jean Livet, both of Geneva; Raphaël Prina, Perly, all of Switzerland

[73] Assignee: Honeywell Lucifer S.A., Carouge, Switzerland

[21] Appl. No.: 727,237

[22] Filed: Jul. 9, 1991

[30] Foreign Application Priority Data

Jul. 17, 1990 [CH] Switzerland .................. 02376/90

[51] Int. Cl.$^5$ ............................................ F16K 31/06
[52] U.S. Cl. ........................... 251/129.05; 251/129.07; 251/129.15
[58] Field of Search .................... 251/129.15, 129.05, 251/129.07

[56] References Cited

U.S. PATENT DOCUMENTS

| | | |
|---|---|---|
| 3,223,802 | 12/1965 | Horst . |
| 3,235,223 | 2/1966 | Wintriss . |
| 3,588,039 | 6/1971 | Chelminski et al. ............ 251/129.15 |
| 4,504,039 | 3/1985 | Akagi . |
| 4,546,795 | 10/1985 | Okamoto et al. .......... 251/129.05 X |
| 4,825,973 | 5/1989 | Harrison . |

FOREIGN PATENT DOCUMENTS 0128124  12/1984  European Pat. Off. .

*Primary Examiner*—Arnold Rosenthal
*Attorney, Agent, or Firm*—Young & Thompson

[57] ABSTRACT

The electromagnetic valve comprises a movable core (8) adapted to be drawn toward a fixed core (7) under the influence of a magnetic field of an excitation winding (5). The lower portion of the core (8) has a skirt (11) surrounding a cylindrical member (9) which is shaped such that the fluid moving from passage (2) to passage (3) will be directed radially relative to the skirt (11), so as to avoid the exertion of a force on the core (8) in its direction of movement.

4 Claims, 2 Drawing Sheets

ELECTROMAGNETICALLY CONTROLLED VALVE FOR THE CONTROL OF THE PASSAGE OF A FLUID

BACKGROUND OF THE INVENTION

There are already known electromagnetically controlled valves for the control of the passage of a fluid, comprising a body with at least one inlet passage and outlet passage for the fluid, a fixed ferromagnetic core and a movable ferromagnetic core disposed face to face in a cylindrical bore surrounded by a winding permitting creating a magnetic field to effect displacement of the movable core in the direction of the fixed core against the action of a return force.

SUMMARY OF THE INVENTION

The invention has for its object to increase the speed of reaction of valves of this type, while preventing the pressure of the fluid from exerting on the movable core a resultant force directed in the direction of its displacement.

To this end, the valve according to the invention is characterized in that at least one passage for the fluid to be controlled opens radially in the bore, at the height of the end of the movable core which is farther from the fixed core, a fixed cylindrical member being disposed in said bore and extending from the end of the bore which is opposite that containing the fixed magnetic core to a point facing the passage opening radially in the bore, an annular space being provided between this cylindrical member and the wall of the bore, the movable core having a skirt adapted to engage in this annular space.

BRIEF DESCRIPTION OF THE DRAWINGS

The accompanying drawing shows schematically and by way of example an embodiment and a variant of the valve according to the invention.

DESCRIPTION OF THE PREFERRED EMBODIMENTS

Figure 1:
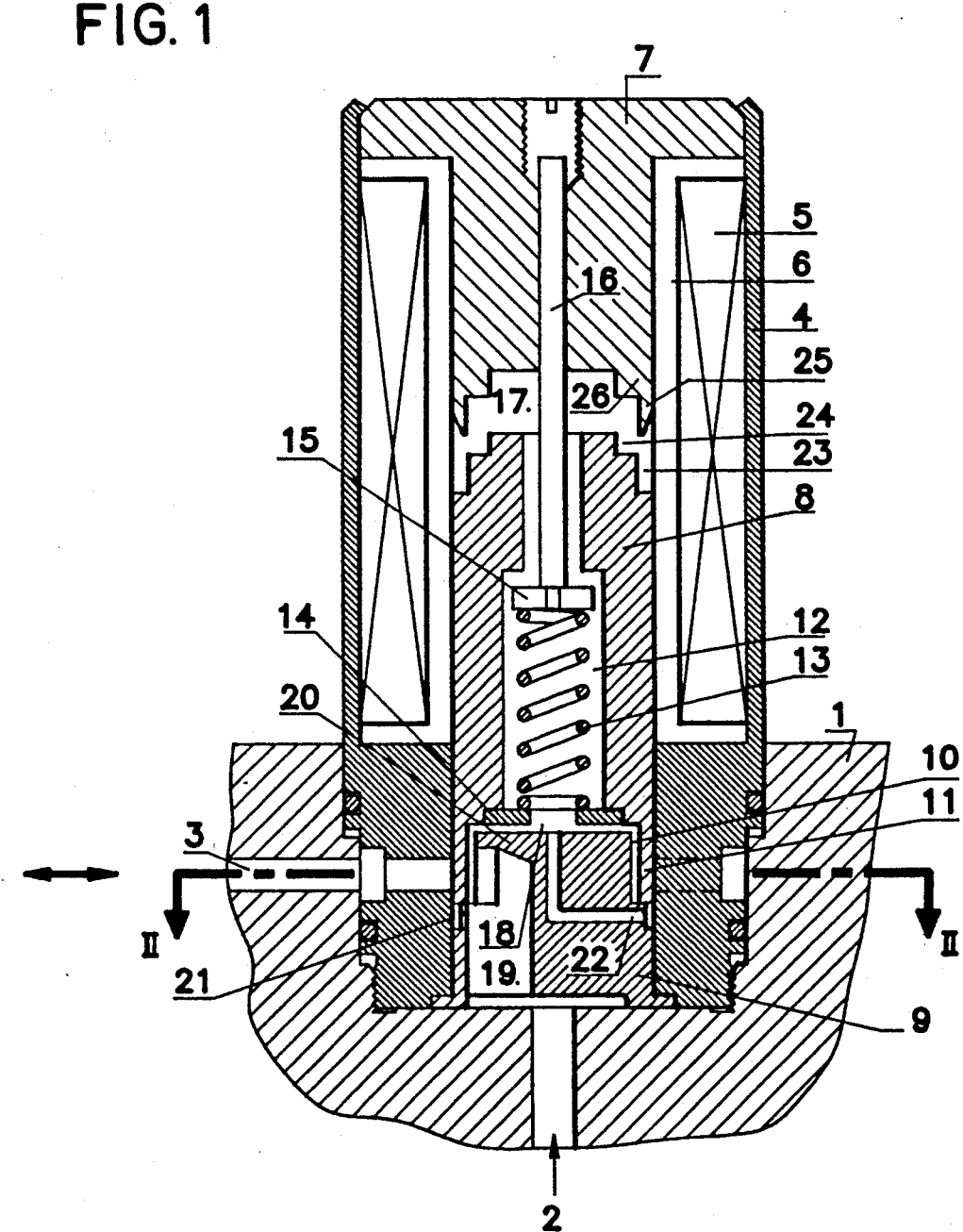
FIG. 1 is an axial cross section of the embodiment.
Figure 2:
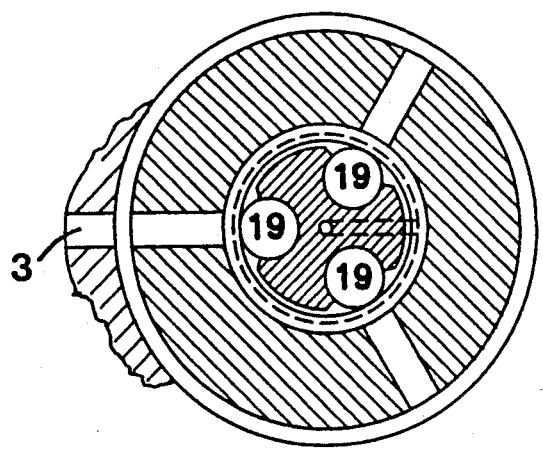
FIG. 2 is a cross section on line II—II of FIG. 1.

As is shown in FIG. 1, the valve comprises a body 1, with two passages 2 and 3 for the entry and exit of the fluid to be controlled and conversely, as the valve is provided to control the passage of the fluid in one direction or the other. The body 1 carries a casing 4 of ferromagnetic material which contains an electric winding 5 carried by a body 6 whose internal recess constitutes a cylindrical bore containing a fixed ferromagnetic core 7 and a movable ferromagnetic core 8.

A cylindrical member 9 is force fitted in the lower end of the cylindrical bore and extends to a point facing the radial passage 3. This member 9 is so shaped as to provide between itself and the bore an annular space 10 in which can engage a skirt 11 constituting a lower portion of the movable core 8. This latter has a longitudinal passage 12 in which is disposed a coil compression spring 13, whose one end bears against a washer 14 force fitted in core 8, its other end bearing against the head 15 of a rod 16 carried by fixed core 7.

The longitudinal passage 12 establishes communication between the space 17 comprised between the two magnetic cores and the space 18 comprised between the movable core 8 and the cylindrical member 9. Thus, the static pressure exerted on the two ends of the movable core 8 is the same, such that there is no hydraulic force resultant acting on this core 8.

It should also be noted that the cylindrical member 9 has three vertical passages 19 placing in communication the two passages 2 and 3 when the movable core 8 is drawn toward the fixed core 7. As is shown in FIG. 1, a portion 20 of member 9 constitutes a deflector above passage 19, such that the fluid passing through passage 2 toward passage 3 is directed radially against the lower part of skirt 11 and accordingly exerts no dynamic pressure on this latter.

Member 9 is so shaped as to provide an annular groove 21 just below the skirt 11, this groove communicating by a passage 22 with space 18, which helps equalize the fluid pressures.

It should be noted that the two confronting surfaces of the fixed core and the movable core have two recesses 23 and 24 and two projecting portions 25 and 26 adapted to enter said recess, so as to obtain a force of magnetic attraction between the cores which will be substantially constant over a major portion of the path of the movable core 8. It will also be noted that the depth of one of these recesses 23 24 is different from that of the other, while the height of the projecting portions 25 and 26 correspond substantially to the respective depths of the recesses, such that in the course of attraction of the movable core the two projecting portions 26 and 27 will be engaged in the two recesses 23 and 24.

Figure 3:
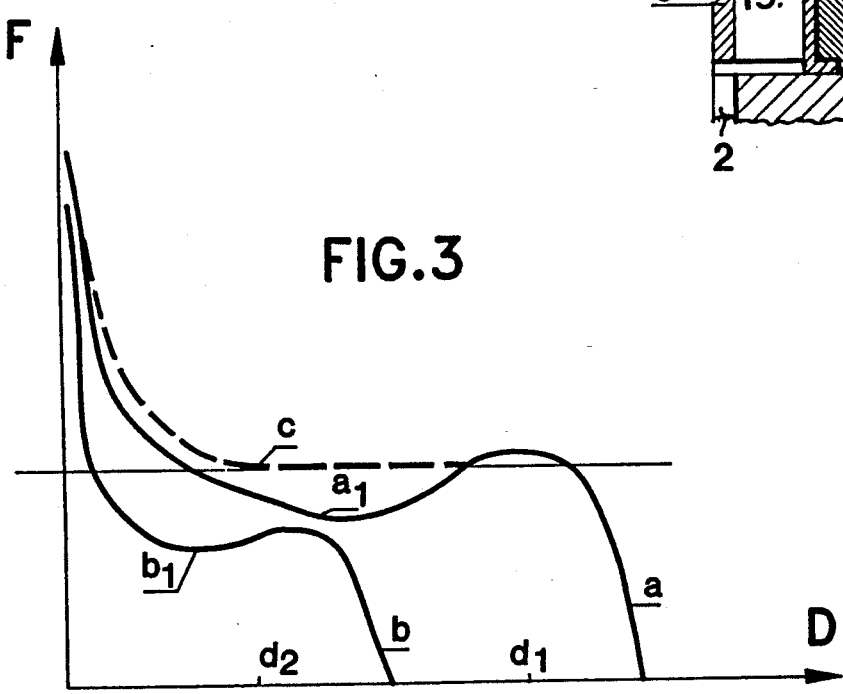
FIG. 3 is an explicatory diagram.

FIG. 3 shows the magnetic attraction force F as a function of path D of the movable magnetic core. The curve a represents substantially the force due to the magnetic field produced between the projecting portion 25 and the recess 23, while the curve b corresponds to the force due to the magnetic field prevailing between the projecting portion 26 and the recess 24. These two curves each have a weaker attraction portion a1 and b1 respectively, which occur when the projecting portions penetrate the recesses and the principal magnetic field is then directed in a direction radial to the two cores and therefore does not contribute to the force of magnetic attraction in the direction of displacement of the movable core. The curve c shows the addition of the attractive forces according to the curves a and b and has a portion comprised between the points d1 and d2 corresponding to a substantially constant attractive force.

It is advantageous so as to obtain fine adjustment of the fluid flow, to feed the excitation winding 5 with current pulses delivered by a source at a frequency higher than the natural oscillation frequency resulting from the mass of the core 8 and the return force of the spring 13. In practice, good results were obtained with substantially rectangular pulses of a frequency of the order of 400 Hz. A variable cyclic and periodic relationship can be superposed on these pulses, this cyclic relationship being adapted to give frequencies such as 38-42-38-42... Hz. This produces a vibration of the core which prevents its sticking in the bore.

Figure 4:
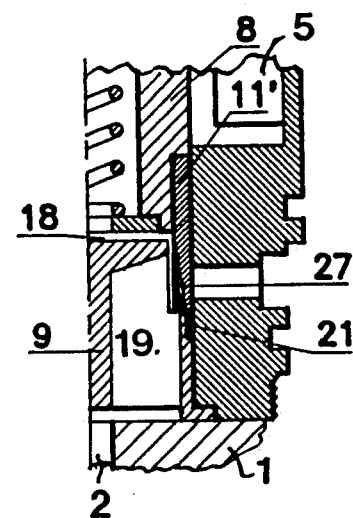
FIG. 4 is a partial cross section of the variant.

FIG. 4 shows a modified embodiment in which the cylindrical member 9 has no passage 22, the communication between the annular groove 21 and the space 18 being achieved by passages 27 provided in the skirt 11' which is constituted by a member secured to the hub 8.

In the two illustrated examples, the obturation of the fluid passage is effected by the external surface of the skirt 11 which bears against the internal surface of the cylindrical bore in which the core 8 moves. However, it could also be arranged that the skirt 11 bears by its internal surface against the external surface of the cylindrical member 9.

Of course numerous modifications of form can be provided and particularly the projecting portions 25 and 26 could be a part of one or the other of the two cores 7 and 8 respectively. These projecting portions and these recesses need not necessarily be of circular section, although this is the shape that is easiest to machine.

We claim:

1. Electromagnetic control valve for controlling the flow of a fluid, comprising a body with at least one inlet and one outlet passage for the fluid, a fixed ferromagnetic core and a movable ferromagnetic core disposed face to face in a cylindrical bore surrounded by an excitation winding permitting creating a magnetic field to effect a displacement of the movable core in the direction of the fixed core against the action of a return force characterized in that at least one passage for the fluid to be controlled opens radially in the bore, in front of an end of the movable core which is farther from the fixed core, a fixed cylindrical member being disposed in said bore and extending from an end of the bore which is opposite that containing the fixed ferromagnetic core to a point opposite the passage opening radially in the bore, an annular space being provided between said cylindrical member and the wall of the bore, said movable core having a skirt adapted to engage in said annular space, said cylindrical member being so shaped as to delimit which the wall of the bore at least one chamber communicating with spaces situated at each end of the movable core via a longitudinal passage provided in said movable core, and wherein so as to obtain a magnetic attraction force between the cores which will be substantially constant over the major portion of the path of the movable core, the two confronting faces of the two cores have at least two recesses and two projecting portions adapted to penetrate said recesses.

2. Valve according to claim 1, characterized in that the depth of one of the recesses is different from that of the other, the heights of the projecting portions corresponding substantially to the respective depths of the recesses, such that at the end of the attraction movement of the movable core, the two projecting portions will be engaged in the two recesses.

3. Valve according to claim 2, characterized in that the recesses are situated on a same face of the core, the two projecting portions being disposed on a same face of the other core.

4. Valve according to claim 2, in which the cores are of circular cylindrical shape, characterized in that the projecting portions and the recesses have circular sections.

* * * * *